June 19, 1956  H. P. HARLE  2,750,759
SLOPING BAFFLE FOR A REFRIGERATOR
Filed July 30, 1952
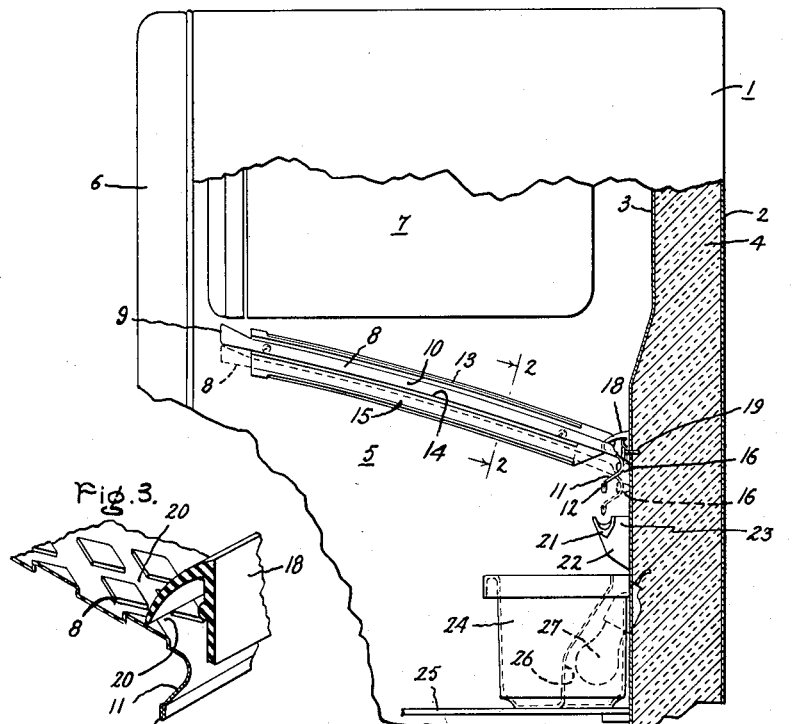
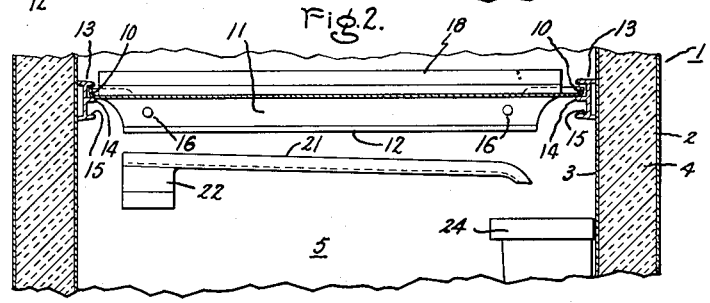
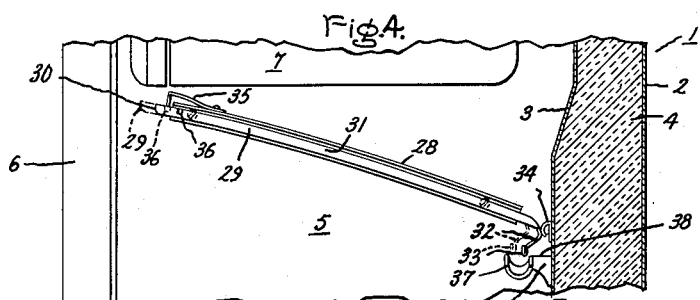
Inventor:
Harold P. Harle,
by
His Attorney.

United States Patent Office 2,750,759
Patented June 19, 1956

2,750,759

SLOPING BAFFLE FOR A REFRIGERATOR

Harold P. Harle, Erie, Pa., assignor to General Electric Company, a corporation of New York Application July 30, 1952, Serial No. 301,756

11 Claims. (Cl. 62—103)

My invention relates to refrigerator cabinets and pertains more particularly to baffling arrangements employable therein.

Some refrigerators include a food storage compartment and an evaporator located in the upper portion of the food storage compartment for cooling the contents thereof. Often in order to control and direct the air circulation through the storage compartment and past the evaporator, a heat insulative baffle is provided and located between the evaporator and the lower portion of the storage compartment. When this type of refrigerator is provided with means for heating the evaporator and thereby effecting defrosting thereof, the baffle is sometimes inclined and serves also as means for catching defrost moisture dropping from the evaporator and for draining the moisture into moisture disposing means. Due to the insulative nature of the baffle, however, the temperature of the baffle does not change rapidly in accordance with the temperature at the evaporator. As a result the baffle does not absorb sufficient heat during the defrosting operation to insure melting during each defrosting operation of frost or ice resulting from residual moisture from the preceding defrosting operation. This causes frozen residual moisture to be left on the insulated baffle after the termination of each defrosting operation. If this frost is not melted during the subsequent defrosting operation, more residual moisture is added and eventually a substantial mass of ice accumulates on the baffle. This mass of ice often interferes with the performance of the refrigerator and must be removed manually. Also due to the insulative nature of the baffle, the baffle does not run cold enough during the refrigerating period to effect moisture condensation thereon. All of the moisture in the storage compartment tends to condense on the evaporator and accumulate thereon as frost. This results in unsatisfactorily low humidity in the food storage compartment from the standpoint of possible food dehydration. Additionally, the accumulation of all of the frost on the evaporator affects adversely the efficiency of the refrigerating system and prolongs the defrosting operation.

Accordingly, the primary object of my invention is to provide in a refrigerator including a storage compartment housing an evaporator and evaporator defrosting means, a new and improved construction for serving both as a baffle for controlling circulation of air through the storage compartment and past the evaporator and as a defrost moisture collector.

Another object of my invention is to provide a combined baffle and defrost moisture collecting structure effective for avoiding the formation of ice masses thereon.

Another object of my invention is to provide a combined baffle and defrost moisture collecting structure effective for minimizing the accumulation of frost on the evaporator thereby to increase the efficiency of the refrigerating system and decrease the time of the defrosting operation.

Still another object of my invention is to provide a new and improved arrangement for insuring a satisfactory humid condition in the food storage compartment.

Further objects and advantages of my invention will become apparent as the following description proceeds and the features of novelty which characterize my invention will be pointed out with particularity in the claims annexed to and forming part of this specification.

In carrying out the objects of my invention, I provide a refrigerator cabinet including a food storage compartment in the upper portion of which is located an evaporator for cooling the compartment. Extending between the side walls of the storage compartment beneath the evaporator is a rearwardly downwardly sloping baffle. The baffle is such as to react quickly to changes in temperature of the evaporator. To obtain the quick reaction to temperature changes, the baffle is constructed to have a low thermal mass and preferably a high thermal conductivity. A trough catches moisture dropping from the rear edge of the baffle and directs it into moisture disposing means. The baffle is differentially positionable for varying air circulation through the storage compartment and over the evaporator. The trough is disposed for minimizing the spilling thereinto of cold air and for facilitating air circulation to the lower portion of the storage compartment.

For a better understanding of my invention, reference may be had to the accompanying drawing in which:

Fig. 1 is a fragmentary view of a refrigerator cabinet partly broken away to illustrate the preferred embodiment of my invention;

Fig. 2 is a fragmentary sectional view taken along the line 2—2 in Fig. 1 and looking in the direction of the arrows;

Fig. 3 is a fragmentary enlarged detail perspective view illustrating the means whereby moisture drains past the gasket; and Fig. 4 is a fragmentary sectional view of the refrigerator cabinet illustrating a second embodiment of my invention.

In Fig. 1 I have shown a refrigerator cabinet generally designated as 1. The cabinet 1 comprises an outer case 2 and a spaced liner 3. Provides in the space between the outer case 2 and the liner 3 is suitable thermal insulating material indicated by 4. Defined by the liner 3 is a food storage compartment 5. Provided for closing an access opening to the food storage compartment 5 is a door 6. Provided for cooling the storage compartment 5 and located in the upper portion thereof is a cooling means or evaporator 7 extending substantially the full width of the compartment 5. During normal operation of the refrigerator a refrigerating system (not shown) supplies liquid refrigerant to the evaporator 7. The refrigerant effectively cools the evaporator 7 and the food storage compartment 5 by absorbing heat from the contents thereof and being thereby vaporized. During this process the warm air in the food storage compartment 5 rises toward the evaporator.

Disposed beneath the evaporator 7 and spaced from the underside thereof for circulating the air to all portions of the storage compartment 5 and over substantially all of the evaporator is the preferred embodiment of my improved baffle or member 8. For a purpose which will be seen hereinafter the baffle 8 is a low mass member formed of any material having high heat conductivity, low density and low specific heat or in other words, any material having high thermal diffusivity. The thickness of the baffle 8 will vary depending on the material of which it is made. It is preferred that the baffle have a good thermal conductivity. To obtain a high degree of satisfactory performance, I prefer forming the baffle of a thin sheet of aluminum but it will be understood that other suitable materials with varying baffle thicknesses depending on the material could be employed to obtain a structure that will perform satisfactorily in reacting quickly to temperature changes. As seen in Figs. 1 and 2 the baffle is tray-like in construction including turned up front and lateral edges 9 and 10, respectively. The rear edge of the baffle 8 is formed as a pendent portion 11, the side edges of which converge downwardly. Additionally the pendent portion 11 is arcuate in cross section, bending away from the rear wall of the liner 3, and includes a beaded lower edge 12 the purpose for which will be described hereinafter.

Provided for supporting the baffle 8 in different sloping positions is a pair of opposed guide rails 13. The guide rails 13 slope downwardly toward the rear wall of the liner 3 and are suitably secured to the inner surfaces of the side walls of the liner. The guide rails 13 each include an upper and lower rail 14 and 15, respectively.

Secured to the pendent portion 11 is a pair of insulative stops or buttons 16. It will be seen that when the baffle 8 is supported in either the upper or lower rails 14 and 15, respectively, the rearward movement of the baffle will be limited by engagement of the stops 16 with the rear wall of the liner 3, and the thermal insulative nature of the stops minimizes heat transfer therethrough to the liner 3.

With prevailing low ambient temperatures, as during winter, heat leakage into the food storage compartment 5 is relatively low requiring less circulation of air through the food storage compartment and past the evaporator 7 for maintaining a satisfactorily low temperature in the storage compartment. Therefore, during such low ambient temperature periods, the baffle 8 is supported on the upper rails 14. With the baffle 8 on the upper rails 14, the upper side of the rear portion of the baffle is engaged by a member or gasket 18. The gasket 18 extends the width of the baffle and is secured as by a plurality of screws 19, only one of which is shown, to the rear wall of the liner 3. With the baffle 8 in engagement with the gasket 18 spilling of cold air downwardly over the rear portion of the baffle 8 is substantially limited. This in turn limits the cooling of the lower portion of the food storage compartment 5. It will be seen that the gasket 18 is replaceable by any other wall structure that will serve the same purpose as the gasket. For instance, a ledge formed horizontally on the rear wall of the liner 3 could be provided for being engaged by the rear edge of the baffle when the baffle is in the upper position thereof.

With prevailing high ambient temperatures, as during the summer, heat leakage into the food storage compartment might be relatively high. This would require a greater circulation of air past the evaporator 7 and through the food storage compartment 5 in order to insure satisfactory cooling of all portions of the storage compartment. Accordingly, during such high ambient temperature periods, the baffle 8 may be supported on the lower rails 15 in the position shown in dash lines in Fig. 1. With the baffle 8 in the lower position the upper surface of the baffle is spaced apart from the gasket 18 and the rear wall of the liner 3. Thus an air passage is provided through which the cold air flowing downwardly over the baffle may spill into the food storage compartment 5. In this manner the air circulation through the food storage compartment 5 and past the evaporator 7 is increased whereby greater cooling of the fresh food compartment is effected to compensate for the greater heat leakage due to high ambient temperature.

In addition to being differentially positionable for controlling air circulation through the fresh food compartment 5 and past the evaporator 7, the baffle 8 also serves as means for collecting moisture resulting from a defrosting operation of the evaporator 7. By means not shown which may be either manually operable or automatically controlled, the evaporator 7 may be heated and thereby defrosted. During the defrosting operation moisture resulting therefrom drops from the evaporator 7 onto the upper side of the sloping baffle 8. The upturned front edge 9 and the upturned side edges 10 formed on the baffle 8 cause the moisture to flow downwardly toward the rear edge of pendent portion 11 of the baffle.

As seen in Fig. 3 the baffle 8 is formed of material which is embossed. Although this is not absolutely essential to the satisfactory performance of the baffle it does render it more rigid, enhance the appearance, and facilitate moisture drainage when the baffle is in the upper position thereof in the manner shown in solid lines in Fig. 1, in which position the gasket 18 engages the upper surface of the baffle. The embossings in the baffle provide channels indicated by 20 through which the moisture may drain past the gasket 18. With this arrangement, and when the baffle is in the upper or low ambient position, the spilling of cold air over the rear edge of the baffle is minimized by the gasket 18 without the gasket retarding the drainage of defrost moisture from the baffle. It will be seen that the drainage channels 20 could be provided in various ways other than by embossing. For instance the baffle could be formed with corrugations. Additionally, by the gasket 18 engaging the upper surface of the baffle 8 moisture draining downwardly on the baffle is prevented from flowing onto the gasket and then dropping in an undirected manner into the food storage compartment 5. Also any water draining down the rear wall of the compartment 5 is directed by the gasket onto the upper surface of the baffle and then drains from the rear edge of the baffle.

After draining past the gasket 18 the defrost moisture follows the contour of the upper or outer surface of the pendent portion 11 to the beaded edge 12 thereof from which it drops. Due to the arcuate cross section of the pendent portion 11 the beaded edge 12 is located away from the rear wall of the liner 3. Disposed beneath the beaded edge 12 to receive the moisture dropping therefrom is an inclined trough 21. Formed off one end of the trough 21 is a bracket portion 22. The bracket portion 22 is suitably secured to the rear wall of the liner 3 and is effective for supporting the trough 21 beneath the beaded edge of the baffle and in spaced apart relation to the liner rear wall. This spacing of the trough 21 from the rear wall of the liner 3 provides a passage indicated by 23 in Fig. 1 through which cold air may flow after having spilled over the rear edge of the baffle 8 when the baffle is in the lower or warm ambient position thereof. In this manner the circulation of air to the lowermost portion of the food storage compartment 5 is improved and the cold air spilling over the rear edge of the baffle 8 into the trough 21 is minimized thereby to avoid the freezing of moisture in the trough.

As seen in Figs. 1 and 2 the lower end of the trough 21 is disposed over a defrost moisture receiving receptacle 24 supported by a shelf 25. Formed in the rear side of the receptacle 24 is a recess 26 permitting the receptacle to be fitted over the storage compartment illuminating lamp 27 mounted on the rear wall of the liner. The receptacle 24 is of a translucent material and, in addition to receiving the defrost moisture, serves as a lamp shade or light diffusing means. The moisture could also be directed as desired and disposed of by various other means. For instance, the moisture could be directed to any suitable arrangement for automatically disposing of the moisture as by evaporation thereof into the atmosphere outside of the storage compartment.

As pointed out above the baffle 8 is formed preferably of a thin sheet of aluminum or any other material having high thermal diffusivity, thereby providing a low mass member adapted for reacting quickly to changes in temperature of the evaporator 7. The baffle also is formed preferably of a material having good thermal conductivity.

Heating of the evaporator 7 to effect defrosting thereof results in the baffle quickly rising in temperature and to a degree whereby any residual moisture frozen on the baffle from the preceding defrosting operation is melted and drains off with the moisture dropping from the evaporator. Thus, residual moisture from a number of succeeding defrosting operations is prevented from accumulating on the baffle and forming ice masses which would require manual removal. Additionally the baffle 8 by becoming heated in this manner insures quick and complete melting of ice masses that might fall from the evaporator 7 onto the baffle during the defrosting operation.

Although the baffle functions satisfactorily in the manner described, it will be seen that various means could be employed for further increasing the temperature of the baffle 8. For instance, a direct thermal path from the heated evaporator 7 to the baffle 8 could be provided by causing a portion of the baffle to be bent upwardly and thermally connected to the evaporator. Additionally a heating element could be applied to the baffle or the lamp 27 could be disposed adjacently beneath the baffle and wired so as to be energized and assist in heating the baffle during the defrosting operations.

Following a defrosting operation and upon restarting of a normal operation of the refrigerator, the temperature of the evaporator 7 decreases. Due to the above-described characteristics of the baffle 8 and the location thereof beneath the evaporator, the baffle reacts quickly and the temperature thereof decreases. Thus during normal operation of the refrigerator the baffle 8 tends to run cold and serve as a refrigerated plate to assist in refrigerating the storage compartment 5, the low temperature of the baffle and its inclination causing a rotary movement of air in the food storage compartment. In serving as a refrigerated plate the baffle 8 is also effective for condensing some of the moisture in the lower portion of the storage compartment 5. However, the temperature of the baffle 8 is not as low as that of the evaporator 7 and the moisture condensed by the baffle is not always frozen thereon. Specifically, in high ambient temperatures the condensate remains liquid during normal operation and drains into the trough 21 for delivery to the receptacle 24. In low ambient temperatures the condensate freezes during normal operation, but thaws and drains into the trough 21 during each subsequent defrosting operation. The slope of the baffle 8 in either its upper or lower position is such that moisture on the underside of the baffle will not drop undirectedly into the storage compartment 5 but will adhere to the baffle, flowing along the underside of the baffle and following the contour of the inner side of the pendent portion 11 to the beaded edge 12 for dropping therefrom into the trough 21. Condensing part of the moisture out of the food storage compartment by means of the baffle 8 rather than letting it all condense and freeze on the evaporator 7 results in several significant advantages. First, it insures a satisfactory humid condition in the food storage compartment 5. Secondly, by avoiding the condensation and freezing of all the moisture on the evaporator 7, it minimizes the amount of latent heat required to be absorbed by the refrigerant in the evaporator before a satisfactorily low temperature of the food storage compartment is attained. Thus, this satisfactorily low temperature may be obtained more quickly following a defrosting operation, resulting in more efficient operation of the refrigerating system. Thirdly, by minimizing the amount of frost formed on the evaporator the required time for defrosting the evaporator is shortened and the increases in temperature of the contents of the storage compartment 5 during the defrosting operation and particularly in temperature of frozen food stored within the evaporator 7 are minimized.

In Fig. 4 is illustrated a second embodiment of my invention. In this form a single rearwardly downwardly sloping guide rail 28 is secured to each of the side walls of the liner 3 for supporting a baffle 29. The baffle 29 is similar to the baffle 8 described above in that it is formed of a thin sheet of aluminum or any other material having high thermal diffusivity and preferably of good thermal conductivity. Further similarity resides in the provisions of upturned front and side edges 30 and 31, respectively, and a pendent rear portion 32 which is bent away from the rear wall of the liner 3 and includes a beaded edge 33. When the baffle 29 is in the solid line position shown in Fig. 4, the pendent portion 32 engages a member or gasket 34 suitably secured to and extending horizontally across the rear wall of the liner 3. With the baffle 29 in this position and the pendent portion 32 in engagement with the gasket 34, the cold air descending from the evaporator 7 is prevented from spilling over the rear edge of the baffle into the storage compartment 5. This is the cool ambient or winter position of the baffle 29 and compares to the upper position of the baffle 8 described above with regard to the first embodiment. In this form of my invention also the gasket is replaceable by any other wall structure, such as a ledge, which will serve the same purpose as the gasket.

The baffle 29 is positionable to a warm ambient or summer position shown in dash lines in Fig. 4 which is comparable to the lower position of the baffle 8 in the first embodiment. Positioning of the baffle 29 in the summer position is effected simply by sliding the baffle forwardly in the guide rails 28. When the baffle assumes the dash line position a resilient detent 35 secured to the front portion of each of the guide rails 28 finds and becomes seated in a notch 36 formed in the respective side edge 31 of the baffle 29 adjacent the front edge 30 thereof. In this manner the baffle 29 is retained in its forward or summer position permitting cold air flowing down the baffle to spill over the rear edge thereof for the same purpose described with regard to the first embodiment.

The material from which the baffle 29 is formed is also embossed for being rendered more rigid and in this form of the invention also the channels provided by the embossings permit drainage of defrost moisture past the gasket 34 and to the beaded edge 33 of the pendent portion 32. Additionally, in this form of the invention also the slope of the baffle is such as to cause moisture on the underside of the baffle to adhere thereto and drain to the beaded edge 33. In both the forward and rear positions of the baffle 29 the beaded edge 33 from which the defrost moisture eventually drops is disposed over a wide sloping trough 37. The trough 37 is similar to the trough 21 in the first embodiment in that it is formed at one edge with a bracket portion 38. The bracket portion 38 is suitably secured to the rear wall of the liner 3 and supports the trough 37 in spaced apart relation to the liner 3. As in the first described embodiment the spacing of the trough 37 from the rear wall of the liner both provides a passage 39 for the spilling of cold air into the lower portion of the storage compartment 5 and minimizes the spilling of the cold air into the trough whereby freezing of moisture in the trough is avoided.

It is to be understood that except for the difference in the means for positioning of the baffle 29 in its warm and cool ambient temperature positions, the baffle 29 operates in the same manner and for obtaining the same results as the baffle 8 in the first described embodiment.

While I have shown and described specific embodiments of my invention I do not desire my invention to be limited to the particular forms shown and described, and I intend by the appended claims to cover all modifications within the spirit and scope of my invention.

What I claim as new and desire to secure by Letters Patent of the United States:

1. In a refrigerator including a storage compartment and cooling means located in the upper portion of said storage compartment and adapted to be defrosted, means for controlling the temperature of said food storage compartment and collecting defrost moisture from said cooling means comprising; a baffle disposed in said storage compartment beneath said cooling means, said baffle dividing said storage compartment into upper and lower portions, said baffle sloping downwardly toward the rear wall of said storage compartment, a member mounted on said rear wall, said baffle being differentially positionable with respect to said member for controlling the spilling of cold air from said upper portion of said storage compartment into said lower portion thereof, a pendent portion formed on the rear of said baffle, said pendent portion being bent away from said rear wall, and a trough spaced from said rear wall and receiving defrost moisture dropping from said pendent portion, the spacing of said trough from said rear wall facilitating circulation of air to said lower portion of said storage compartment and minimizing spilling of cold air into said trough thereby to avoid freezing of moisture therein.

2. In a refrigerator including a storage compartment and cooling means located in the upper portion of said storage compartment and adapted to be heated for effecting defrosting thereof, means for controlling the temperature of said food storage compartment and collecting defrost moisture from said cooling means comprising; a member disposed in said storage compartment beneath said cooling means and dividing said storage compartment into upper and lower portions, a wall structure included in said storage compartment, said member being differentially positionable with respect to said wall structure for controlling the spilling of cold air from said upper portion of said storage compartment into said lower portion thereof, said member being formed of a thin sheet of aluminum for reacting quickly to temperature changes of said cooling means, said member normally being cooled by said cooling means and condensing some of the moisture in said lower portion of said storage compartment, said member increasing in temperature sufficiently during each defrosting operation for melting off said member frozen residual moisture from a preceding defrosting operation thereby to prevent the accumulation of frozen residual moisture on said member, a pendent portion formed on the edge of said member adjacent said wall structure, said pendent portion being bent away from said wall structure, and a trough spaced from said wall structure and receiving defrost moisture dropping from said pendent portion, the spacing of said trough from said wall facilitating circulation of air to said lower portion of said storage compartment and minimizing spilling of cold air into said trough thereby to avoid freezing of moisture therein.

3. In a refrigerator including a storage compartment and cooling means located in the upper portion of said storage compartment and adapted to be heated for effecting defrosting thereof, means for controlling the temperature of said storage compartment and collecting defrost moisture from said cooling means comprising; a baffle disposed in said storage compartment beneath said cooling means and dividing said storage compartment into upper and lower portions, said baffle sloping downwardly toward the rear wall of said storage compartment, a member mounted on said rear wall, said baffle being differentially positionable with respect to said member for controlling the spilling of cold air from said upper portion of said storage compartment into said lower portion thereof, said baffle being formed of a thin sheet of aluminum for reacting quickly to temperature changes of said cooling means, said baffle normally being cooled by said cooling means and condensing some of the moisture in said lower portion of said storage compartment, said baffle increasing in temperature sufficiently during each defrosting operation for melting off said baffle frozen residual moisture from a preceding defrosting operation thereby to prevent accumulation of frozen residual moisture on said baffle, a pendent portion formed on the edge of said baffle adjacent said rear wall, said pendent portion being bent away from said rear wall, and a trough spaced from said rear wall and receiving defrost moisture dropping from said pendent portion, the spacing of said trough from said rear wall facilitating circulation of air to said lower portion of said storage compartment and minimizing the spilling of cold air into said trough thereby to avoid freezing of moisture therein.

4. In a refrigerator including a storage compartment and cooling means located in the upper portion of said storage compartment and adapted to be heated for effecting defrosting thereof, means for controlling the temperature of said storage compartment and collecting defrost moisture from said cooling means comprising; a baffle disposed in said storage compartment beneath said cooling means and dividing said storage compartment into upper and lower portions, said baffle sloping downwardly toward the rear wall of said storage compartment, a gasket mounted on said rear wall of said storage compartment, said baffle being selectively positionable for engaging said gasket and for being spaced therefrom, engagement of said baffle with said gasket minimizing the spilling of cold air from said upper portion of said storage compartment into said lower portion thereof, spacing of said baffle from said gasket providing a passage for said spilling of said cold air into said lower portion of said storage compartment, said baffle being formed of a thin sheet of aluminum for reacting quickly to temperature changes of said cooling means, said baffle normally being cooled by said cooling means and condensing some of the moisture in said lower portion of said storage compartment, said baffle increasing in temperature sufficiently during each defrosting operation for melting off said baffle frozen residual moisture from a preceding defrosting operation thereby to prevent accumulation of frozen residual moisture on said baffle, a pendent portion formed on the rear of said baffle, said pendent portion being bent away from said rear wall, and a trough spaced from said rear wall and receiving defrost moisture dropping from said pendent portion, the spacing of said trough from said rear wall facilitating circulation of air to said lower portion of said storage compartment and minimizing the spilling of cold air into said trough thereby to avoid freezing of moisture therein.

5. In a refrigerator including a storage compartment and cooling means located in the upper portion of said storage compartment and adapted to be heated for effecting defrosting thereof, means for controlling the temperature of said storage compartment and collecting defrost moisture from said cooling means comprising; a baffle disposed in said storage compartment beneath said cooling means and dividing said storage compartment into upper and lower portions, said baffle sloping downwardly toward the rear wall of said storage compartment, a pendent portion formed on the rear of said baffle, said pendent portion being bent away from said rear wall, a horizontal gasket mounted on said rear wall of said storage compartment, said baffle being selectively positionable in upper and lower positions, the upper surface of sdia baffle being engaged by said gasket when in said upper position whereby spilling of cold air from said upper portion of said storage compartment into said lower portion thereof is minimized, means providing drainage of moisture past said gasket to said pendent portion when said baffle is in said upper position, said baffle being spaced from said gasket and said rear wall when said lower position whereby a passage is provided for said spilling of said cold air into said lower portion of said storage compartment, said baffle being formed of a thin sheet of aluminum for reacting quickly to temperature changes of said cooling means, said baffle normally being cooled by said cooling means and condensing some of the moisture in said lower portion of said storage compartment, said baffle increasing in temperature sufficiently during each defrosting operation for melting off said baffle frozen residual moisture from a preceding defrosting operation thereby to prevent the accumulation of frozen residual moisture on said baffle, and a trough spaced from said rear wall receiving defrost moisture dropping from said pendent portion, the spacing of said trough from said rear wall facilitating circulation of air to said lower portion of said storage compartment and minimizing spilling of cold air into said trough thereby to avoid freezing of moisture therein.

6. In a refrigerator including a storage compartment and cooling means located in the upper portion of said storage compartment and adapted to be heated for effecting defrosting thereof, means for controlling the temperature of said storage compartment and collecting defrost moisture from said cooling means comprising; a baffle disposed in said storage compartment beneath said cooling means and dividing said storage compartment into upper and lower portions, said baffle sloping downwardly toward the rear wall of said storage compartment, a horizontal gasket mounted on said rear wall of said storage compartment, said baffle being selectively positionable in forward and rear sloping positions, said baffle engaging said gasket when in said rear position whereby the spilling of cold air from said upper portion of said storage compartment into said lower portion thereof is minimized, said baffle being spaced from said gasket and said back wall when in said forward position whereby a passage is provided for said spilling of said cold air into said lower portion of said storage compartment, said baffle having low mass and being formed of a material having high thermal diffusivity for reacting quickly to temperature changes of said cooling means, said baffle normally being cooled by said cooling means and condensing some of the moisture in said lower portion of said storage compartment, said baffle increasing in temperature sufficiently during each defrosting operation for melting off said baffle frozen residual moisture from a preceding defrosting operation thereby to prevent the accumulation of frozen residual moisture on said baffle.

7. In a refrigerator including a storage compartment and cooling means located in the upper portion of said storage compartment and adapted to be heated for effecting defrosting thereof, means for controlling the temperature of said storage compartment and collecting defrost moisture from said cooling means comprising; a baffle disposed in said storage compartment beneath said cooling means and dividing said storage compartment into upper and lower portions, said baffle sloping downwardly toward the rear wall of said storage compartment, a pendent portion formed on the rear of said baffle, said pendent portion being bent away from said rear wall, a horizontal gasket mounted on said rear wall of said storage compartment, said baffle being selectively positionable in rear and forward sloping positions, said baffle engaging said gasket when in said rear position whereby the spilling of cold air from said upper portion of said storage compartment into said lower portion thereof is minimized, means providing drainage of moisture past said gasket to said pendent portion when said baffle is in said rear position, said baffle being spaced from said gasket and said back wall when in said forward position whereby a passage is provided for said spilling of said cold air into said lower portion of said storage compartment, said baffle being formed of a thin sheet of aluminum for reacting quickly to temperature changes of said cooling means, said baffle normally being cooled by said cooling means and condensing some of the moisture in said lower portion of said storage compartment, said baffle increasing in temperature sufficiently during each defrosting operation for melting off said baffle frozen residual moisture from a preceding defrosting operation thereby to prevent accumulation of frozen residual moisture on said baffle, and a trough spaced from said pendent portion, the spacing of said trough from said rear wall facilitating circulation of air to said lower portion of said storage compartment and minimizing spilling of cold air into said trough thereby to avoid freezing of moisture therein.

8. In a refrigerator including a storage compartment and a full width evaporator located in the upper portion of said storage compartment and adapted to be heated for effecting defrosting thereof, means for controlling the temperature of said storage compartment and collecting defrost moisture from said evaporator comprising; a baffle extending between the side walls of said storage compartment and spaced from the underside of said evaporator, said baffle dividing said storage compartment into upper and lower portions, said baffle sloping downwardly toward the rear wall of said storage compartment, the rear edge of said baffle being bent downwardly and away from said rear wall, a horizontal gasket mounted on said rear wall of said storage compartment, said baffle being selectively positionable in upper and lower positions, the upper surface of said baffle being engaged by said gasket when in said upper position whereby spilling of cold air from said upper portion of said storage compartment into said lower portion thereof is minimized, the upper surface of said baffle including channels providing drainage of moisture past said engaging gasket to said rear edge of said baffle, said baffle being spaced from said gasket and said back wall when in said lower position whereby a passage is provided for said spilling of said cold air into said lower portion of said storage compartment, said baffle being formed of a thin sheet of aluminum for reacting quickly to temperature changes of said evaporator, said baffle normally being cooled by said evaporator and condensing some of the moisture in said lower portion of said storage compartment, said baffle increasing in temperature sufficiently during each defrosting operation for melting off said baffle frozen residual moisture from a preceding defrosting operation thereby to prevent the accumulation of frozen residual moisture on said baffle, the slope of said baffle causing defrost moisture on the underside of said baffle to adhere thereto and drain to said rear edge of said baffle, an inclined trough spaced from said rear wall for receiving defrost moisture dropping from said rear edge of said baffle, the spacing of said trough from said rear wall facilitating circulation of air to said lower portion of said storage compartment and minimizing spilling of cold air into said trough thereby to avoid freezing of moisture therein, and moisture disposing means receiving said defrost moisture from said trough.

9. In a refrigerator including a storage compartment and a full width evaporator located in the upper portion of said storage compartment and adapted to be heated for effecting defrosting thereof, means for controlling the temperature of said storage compartment and collecting defrost moisture from said evaporator comprising; a baffle extending between the side walls of said storage compartment and spaced from the underside of said evaporator, said baffle dividing said storage compartment into upper and lower portions, said baffle sloping downwardly toward the rear wall of said storage compartment, the rear edge of said baffle being bent downwardly and away from said rear wall, a horizontal gasket mounted on said rear wall of said storage compartment, said baffle being selectively positionable in forward and rear sloping positions, said rear edge of said baffle engaging said gasket when in said rear position whereby the spilling of cold air from said upper portion of said storage compartment into said lower portion thereof is minimized, the surface of said baffle engaging said gasket including channels providing drainage of moisture past said gasket to said rear edge of said baffle, said baffle being spaced from said gasket and said back wall when in said forward position whereby a passage is provided for said spilling of said cold air into said lower portion of said storage compartment, said baffle being formed of a thin sheet of aluminum for reacting quickly to temperature changes of said evaporator, said baffle normally being cooled by said evaporator and condensing some of the moisture in said lower portion of said storage compartment, said baffle increasing in temperature sufficiently during each defrosting operation for melting off said baffle frozen residual moisture from a preceding defrosting operation thereby to prevent accumulation of frozen residual moisture on said baffle, the slope of said baffle causing defrost moisture on the underside of said baffle to adhere thereto and drain to said rear edge of said baffle, an inclined trough spaced from said rear wall receiving defrost moisture dropping from said rear edge of said baffle, the spacing of said trough from said rear wall facilitating circulation of air to said lower portion of said storage compartment and minimizing spilling of said cold air into said trough thereby to avoid freezing of moisture therein, a moisture disposing means receiving said defrost moisture from said trough.

10. In a refrigerator including a storage compartment and cooling means located in the upper portion of said storage compartment and adapted to be heated for effecting defrosting thereof, means for controlling the temperature of said storage compartment and collecting defrost moisture from said cooling means comprising a baffle disposed in said storage compartment beneath said cooling means and dividing said storage compartment into upper and lower portions, said baffle sloping downwardly toward the rear wall of said storage compartment, a pendent portion formed on the rear of said baffle, said pendent portion being bent away from said rear wall, a horizontal gasket mounted on said rear wall of said storage compartment, said baffle being selectively positionable for engaging said gasket and for being spaced there from, engagement of said baffle with said gasket minimizing the spilling of cold air from said upper portion of said storage compartment into said lower portion thereof, spacing of said baffle from said gasket providing a passage for said spilling of said cold air into said lower portion of said storage compartment, means providing drainage of moisture past said gasket to said pendent portion when said baffle is in engagement with said gasket, said baffle having low thermal mass for reacting quickly to temperature changes of said cooling means, said baffle normally being cooled by said cooling means and condensing some of the moisture in said lower portion of said storage compartment, said baffle increasing in temperature sufficiently during each defrosting operation for melting off said baffle frozen residual moisture from a preceding defrosting operation thereby to prevent the accumulation of frozen residual moisture on said baffle, and a trough spaced from said rear wall receiving defrost moisture dropping from said pendent portion, the spacing of said trough from said rear wall facilitating the circulation of air to said lower portion of said storage compartment, and minimizing spilling of cold air into said trough thereby to avoid freezing of moisture therein.

11. In a refrigerator including a storage compartment and a full width evaporator located in the upper portion of said storage compartment and adapted to be heated for effecting defrosting thereof, means for controlling the temperature of said storage compartment and collecting defrost moisture from said evaporator comprising a baffle extending between the side walls of said storage compartment and spaced from the underside of said evaporator, said baffle dividing said storage compartment into upper and lower portions, said baffle sloping downwardly toward the rear wall of said storage compartment, the rear edge of said baffle bent downwardly and away from said rear wall, a horizontal gasket mounted on said rear wall of said storage compartment, said baffle being selectively positionable for engaging said gasket and for being spaced therefrom, engagement of said baffle with said gasket minimizing the spilling of cold air from said upper portion of said storage compartment into said lower portion thereof, the upper surface of said baffle including channels providing drainage of moisture past said engaging gasket to said rear edge of said baffle, spacing of said baffle from said gasket providing a passage for said spilling of said cold air into said lower portion of said storage compartment, said baffle having low thermal mass for reacting quickly to temperature changes of said evaporator, said baffle normally being cooled by said evaporator and condensing some of the moisture in said lower portion of said storage compartment, said baffle increasing in temperature sufficiently during each defrosting operation for melting off said baffle frozen residual moisture from a preceding defrosting operation thereby to prevent the accumulation of frozen residual moisture on said baffle, the slope of said baffle causing defrost moisture on the underside of said baffle to adhere thereto and drain to said rear edge of said baffle, an inclined trough spaced from said rear wall for receiving defrost moisture dropping from said rear edge of said baffle, the spacing of said trough from said rear wall facilitating circulation of air to said lower portion of said storage compartment and minimizing spilling of cold air into said trough thereby to avoid freezing of moisture therein, and moisture disposing means receiving said defrost moisture from said trough.

References Cited in the file of this patent

UNITED STATES PATENTS

| | | |
|---|---|---|
| 2,292,032 | Atchison | Aug. 4, 1942 |
| 2,450,305 | Shoemaker | Sept. 28, 1948 |
| 2,510,758 | Rundell | June 6, 1950 |
| 2,511,126 | Philipp | June 13, 1950 |
| 2,581,618 | Anderson et al. | Jan. 8, 1952 |
| 2,625,017 | Tucker | Jan. 13, 1953 |